US012576805B2

(12) United States Patent

Looy et al.

(10) Patent No.: US 12,576,805 B2

(45) Date of Patent: Mar. 17, 2026

(54) SYSTEM AND METHOD FOR DETECTING OPERATOR CHARACTERISTIC TO ADJUST POSITION OF POWER ACTUATED MOVABLE PANEL

(71) Applicant: UUSI, LLC, Reed City, MI (US)

(72) Inventors: Bradley D. Looy, Big Rapids, MI (US); David W. Shank, Hersey, MI (US)

(73) Assignee: UUSI, LLC, Reed City, MI (US)

( * ) Notice: Subject to any disclaimer, the term of this patent is extended or adjusted under 35 U.S.C. 154(b) by 128 days.

(21) Appl. No.: 18/405,962

(22) Filed: Jan. 5, 2024

(65) Prior Publication Data

US 2024/0140342 A1 May 2, 2024

Related U.S. Application Data

(63) Continuation-in-part of application No. 17/156,837, filed on Jan. 25, 2021, now Pat. No. 11,898,396.

(51) Int. Cl.

| | |
|---|---|
| *B60R 21/0134* | (2006.01) |
| *B60R 16/03* | (2006.01) |
| *G01S 13/56* | (2006.01) |
| *G01S 13/72* | (2006.01) |
| *B60R 21/34* | (2011.01) |

(52) U.S. Cl.

CPC ...... *B60R 21/0134* (2013.01); *B60R 16/0307* (2013.01); *G01S 13/56* (2013.01); *G01S 13/723* (2013.01); *B60R 2021/346* (2013.01)

(58) Field of Classification Search

CPC ............ B60R 21/0134; B60R 16/0307; B60R 2021/346; G01S 13/56; G01S 13/72

See application file for complete search history.

(56) References Cited

U.S. PATENT DOCUMENTS

| | | | | | |
|---|---|---|---|---|---|
| 1,092,900 | A | * | 4/1914 | Davison et al. | ......... A41B 9/08 |
| | | | | | 2/78.2 |
| 5,334,876 | A | | 8/1994 | Washeleski et al. | |
| 5,952,801 | A | | 9/1999 | Boisvert et al. | |
| 6,064,165 | A | | 5/2000 | Boisvert et al. | |
| 7,312,591 | B2 | | 12/2007 | Washeleski et al. | |
| 7,342,373 | B2 | | 3/2008 | Newman et al. | |
| 7,449,852 | B2 | | 11/2008 | Washeleski et al. | |
| 7,518,327 | B2 | | 4/2009 | Newman et al. | |
| 9,030,144 | B2 | | 5/2015 | Boisvert et al. | |
| 9,051,769 | B2 | | 6/2015 | Newman et al. | |
| 9,290,077 | B2 | | 3/2016 | Newman et al. | |
| 9,470,033 | B1 | * | 10/2016 | Dudar | ..................... E05F 15/73 |

(Continued)

FOREIGN PATENT DOCUMENTS

| | | |
|---|---|---|
| DE | 10 2013 010 993 A1 | 1/2015 |
| DE | 10 2017 128 774 A1 | 6/2019 |
| DE | 20 2020 100 732 A1 | 4/2020 |

*Primary Examiner* — Tan Q Nguyen

(74) *Attorney, Agent, or Firm* — Howard & Howard Attorneys PLLC

(57) ABSTRACT

A system and method include a radar sensor disposed in a vehicle for detecting an operator motion or gesture that indicates a desire to perform a function of the vehicle, and a controller in communication with the radar sensor to interpret sensor data and determine if the operator performed a predetermined motion or gesture that indicates the desire to perform the function of the vehicle based on the predetermined motion or gesture.

27 Claims, 7 Drawing Sheets

(56) References Cited

U.S. PATENT DOCUMENTS

| | | | |
|---|---|---|---|
| 9,575,481 | B2 | 2/2017 | Newman et al. |
| 9,705,494 | B2 | 7/2017 | Newman et al. |
| 9,797,179 | B2 | 10/2017 | Washeleski et al. |
| 10,017,977 | B2 | 7/2018 | Newman et al. |
| 10,954,709 | B2 | 3/2021 | Washeleski et al. |
| 11,313,167 | B2 | 4/2022 | Akbarian et al. |
| 2006/0202651 | A1 | 9/2006 | Washeleski et al. |
| 2007/0152615 | A1 | 7/2007 | Newman et al. |
| 2008/0030156 | A1 | 2/2008 | Washeleski et al. |
| 2008/0136358 | A1 | 6/2008 | Newman et al. |
| 2009/0198420 | A1 | 8/2009 | Newman et al. |
| 2010/0241321 | A1 | 9/2010 | Luka et al. |
| 2011/0041409 | A1 | 2/2011 | Newman et al. |
| 2011/0057773 | A1 | 3/2011 | Newman et al. |
| 2011/0160935 | A1 | 6/2011 | Newman et al. |
| 2011/0187492 | A1 | 8/2011 | Newman et al. |
| 2013/0055639 | A1 | 3/2013 | Brosseit |
| 2013/0311039 | A1 | 11/2013 | Washeleski et al. |
| 2015/0009062 | A1 | 1/2015 | Herthan |
| 2015/0267455 | A1 | 9/2015 | Washeleski et al. |
| 2018/0030771 | A1 | 2/2018 | Washeleski et al. |
| 2018/0363357 | A1 | 12/2018 | Polewarczyk et al. |
| 2019/0162822 | A1* | 5/2019 | Rafrafi .................... E05F 15/76 |
| 2019/0249480 | A1* | 8/2019 | Tokudome .......... B60R 25/2054 |
| 2020/0256113 | A1 | 8/2020 | Salter et al. |
| 2021/0087868 | A1 | 3/2021 | Washeleski et al. |
| 2022/0205309 | A1* | 6/2022 | Castonguay ............ E05F 15/74 |
| 2022/0324415 | A1* | 10/2022 | Salter ................... B60R 25/305 |
| 2024/0028126 | A1* | 1/2024 | Corner ................... E05F 15/76 |

* cited by examiner

SYSTEM AND METHOD FOR DETECTING OPERATOR CHARACTERISTIC TO ADJUST POSITION OF POWER ACTUATED MOVABLE PANEL

CROSS REFERENCE TO RELATED APPLICATION(S)

This application is a continuation-in-part and claims the benefit of U.S. patent application Ser. No. 17/156,837, filed on Jan. 25, 2021, the disclosure of which is expressly hereby incorporated by reference.

BACKGROUND OF THE INVENTION

1. Field of the Invention

The present invention relates generally to adjusting a position of a power actuated movable panel for a vehicle and, more specifically, to a system and method for detecting an operator characteristic to adjust a position of a power actuated movable panel for a vehicle.

2. Description of the Related Art

Vehicles such as motor vehicles have had power actuated movable panels for many years. The power actuated movable panels may include a power actuated lift gate, trunk, door, or tailgate. These power actuated movable panels add convenience and easy access to a cargo storage area of the vehicle. The power actuated opening of the movable panel may be started with a press of a button on a key fob or a switch on the movable panel itself such as in the license plate area or on a handle.

However, these methods present a disadvantage when an operator such as a person is approaching the vehicle and has their hands full such as with large packages or many bags. This disallows easy access to either the key fob or the switch mounted on the movable panel or other location.

Currently, there are devices that allow for a hands-free open power actuation of the moveable panel, such as kicking a foot under a rear bumper of the vehicle. These devices are typically located under the rear bumper to detect the foot kicking gesture. Upon sensing a kick, the moveable panel will begin opening. This presents another disadvantage in that the person must balance on one foot while kicking with the other and, if they must do so with large packages or bags, they may potentially lose their balance. Another disadvantage is that, after the kicking gesture is sensed, the moveable panel begins opening. This could lead to the moveable panel striking the person and potentially causing injury.

Yet another disadvantage is that the power actuated movable panel such as a lift gate opens to the fully open position. Because the switch used to initiate the closing of the power actuated movable panel is located on the bottom of the panel, it may be out of reach because the movable panel has opened to a full-open position. This disallows a shorter person or persons with mobility restrictions, such as a person in a wheelchair, from initiating the closing of the power actuated movable panel.

Accordingly, it is desirable to provide a system and method for improved presence and characteristics sensing of an operator as they approach a vehicle to overcome the disadvantages previously presented. Thus, there is a need in the art to provide a system and method for detecting an operator characteristic to adjust a position of a power actuated movable panel for a vehicle that meets at least one of these desires.

SUMMARY OF THE INVENTION

Accordingly, the present invention provides a system and method for detecting an operator characteristic to adjust a position of a power actuated movable panel for a vehicle including sensing an approach or proximity of an operator, measuring an operator characteristic such as a height of the operator, and controlling a distance a power actuated movable panel moves based on the height of the operator.

In one embodiment, the present invention provides a system including a sensor disposed adjacent a power actuated movable panel of a vehicle for detecting an approach of an operator to the power actuated movable panel and measuring at least one operator characteristic of the operator in proximity to the sensor. The system also includes a controller in communication with the sensor to interpret sensor data of the operator from the sensor to determine the at least one operator characteristic to adjust a position of the power actuated movable panel based on the at least one operator characteristic.

In addition, the present invention provides a method including the steps of detecting, by a sensor disposed adjacent a power actuated movable panel of a vehicle, an approach of an operator to the power actuated movable panel, measuring, by the sensor, at least one operator characteristic of the operator in proximity to the sensor, and determining, by a controller in communication with the sensor, the at least one operator characteristic to adjust a position of the power actuated movable panel based on the at least one operator characteristic.

In another embodiment, the present invention provides a system including a radar sensor disposed in a vehicle for detecting an operator motion or gesture that indicates a desire to perform a function of the vehicle. The system also includes a controller in communication with the radar sensor to interpret sensor data and determine if the operator performed a predetermined motion or gesture that indicates the desire to perform the function of the vehicle based on the predetermined motion or gesture.

One advantage of the present invention is that the new system and method provides for detecting an operator characteristic to adjust a position of a power actuated movable panel for a vehicle. Another advantage of the present invention is that the system and method can detect an operator and an operator characteristic to adjust a position of a power actuated moving panel for a vehicle. The advantageous sensing of an operator characteristic provides the mechanism and method of detecting a motion and/or gesture and performing a desired function without the need to physically touch a button, switch, surface, or the like.

Radar based gesture sensing holds great promise in fostering inclusivity within the automotive industry, particularly for individuals facing physical disabilities. The conventional interface of vehicles, reliant on manual controls, can pose significant challenges for those with limited mobility or dexterity. The integration of radar technology introduces a paradigm shift by providing alternative means of control, such as gesture-based inputs, thereby extending the opportunity for individuals with disabilities to experience a newfound level of autonomy and independence while driving.

In the realm of accessibility, the significance of radar-based gesture sensing lies in its ability to cater to a diverse range of needs. For instance, individuals with upper limb impairments or those who may find it difficult to operate traditional controls can leverage intuitive hand or body gestures to interact with various vehicle functions. This adaptability empowers users to tailor the control interface to their specific abilities, fostering a sense of agency and self-sufficiency. By breaking down the physical barriers associated with traditional control mechanisms, radar-based gesture sensing not only enhances accessibility, but also promotes a more equitable and inclusive driving experience for individuals with diverse physical capabilities.

Furthermore, the incorporation of gesture-based controls aligns with the broader societal push toward universal design principles, emphasizing the creation of products and environments that are usable by people of all abilities. Radar technology's role in making vehicles more accessible underscores the industry's commitment to ensuring that advancements in automotive technology are not exclusive, but instead embrace inclusivity, recognizing the varied needs and abilities of a diverse population of drivers. As the automotive landscape continues to evolve, the emphasis on accessibility through technologies like radar-based gesture sensing reflects a positive stride toward a more inclusive future for mobility.

Yet another advantage of the present invention is that the system and method can be used for object obstruction detection.

Other features and advantages of the present invention will be readily appreciated, as the same becomes better understood, after reading the subsequent description taken in conjunction with the accompanying drawings.

DETAILED DESCRIPTION OF THE
PREFERRED EMBODIMENT(S)

In general, the present invention relates to a system for detecting an object such as an operator of the type well-suited for use in many vehicular closure applications for vehicles. The system for detecting an operator characteristic to adjust a position of a power actuated movable panel for a vehicle and associated methods of operation of the present invention will be described in conjunction with one or more example embodiments. These embodiments are merely provided to describe the inventive concepts, features, advantages, and objectives with sufficient clarity to permit those skilled in the art to understand and practice what is described.

The present invention provides a system that allows for physical characteristic measurements of an operator and performing an action based on those measurements. In one embodiment, the system includes a sensor for sensing an approach of an operator to a vehicle, measuring at least one characteristic of the operator, and controlling a parameter of a power actuated moving panel of the vehicle based on the at least one characteristic of the operator.

In one embodiment, the system includes a sensor and a controller for a power actuated movable panel of a vehicle. The sensor generates an object signal indicative of an object such as a person being detected in proximity to the sensor. The controller transmits a panel control signal to a motor for the motor to move the movable panel of the vehicle along a path between closed and opened positions while the motor receives power from a power source. The controller communicates with vehicle modules over an in-vehicle communications bus such as CAN or LIN, and as such, the controller may transmit a panel control signal to another vehicle module that controls the power applied to the motor for moving the movable panel.

Various methods have been used for automatic opening of power actuated movable panels such as a power actuated lift gate without the need for pressing a button on a key fob or on the lift gate itself. Ultrasonic, radar, lidar, camera, and capacitive sensing can measure the distance and rate that an operator such as a person is approaching a vehicle, but only radar, lidar, and cameras can determine the height and other physical characteristics of the person.

Figure 1:
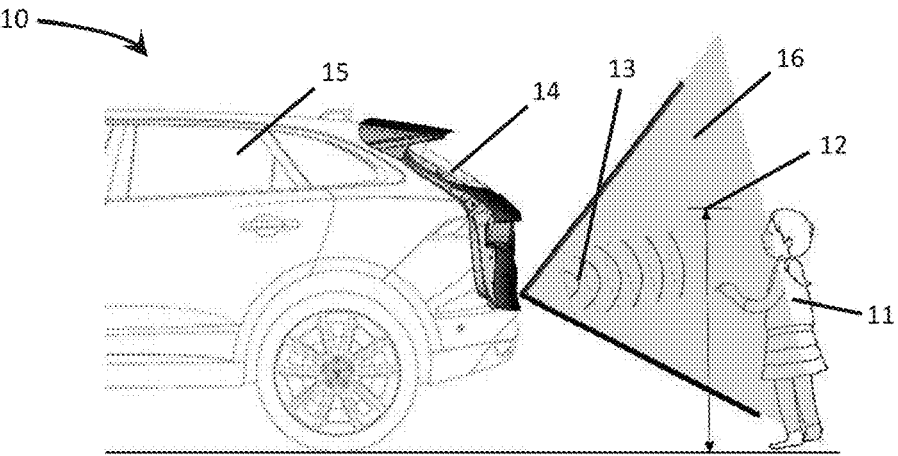
FIG. 1 is an elevational view of a system, according to the present invention, for detecting an operator characteristic to adjust a position of a power actuated movable panel of a vehicle illustrating an operator such as a child approaching a rear of the vehicle in which a sensor is used to detect the approach of the child and a height of the child.
Figure 2:
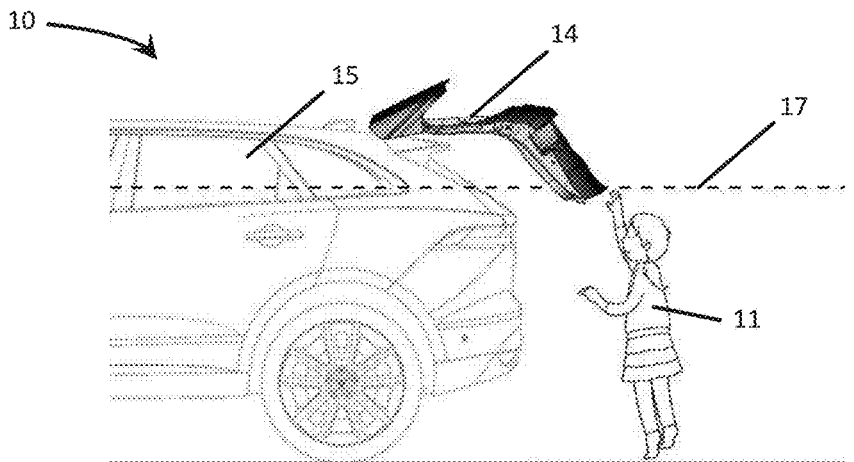
FIG. 2 is an elevational view of the system of FIG. 1 illustrating a child reaching for a switch on a lower edge of the power actuated lift gate of the vehicle.

Referring to the figures, and in particular FIGS. 1-6, wherein like numerals indicate like parts throughout the several views, one embodiment of a system 10, according to the present invention, for detecting an object or operator such as a person and an operator characteristic for controlling or adjusting a position of a power actuated movable panel for a vehicle 15 is generally shown. As illustrated in FIG. 1, the system 10 and an operator 11 such as a child approaching a back or rear of the vehicle 15 having a power actuated movable panel such as a power actuated lift gate 14. In one embodiment, the system 10 includes a sensor/controller 26 (FIG. 7) such as of a radar type equipped or disposed on, disposed in, or adjacent the power actuated lift gate 14. As the operator 11 approaches the vehicle 15, a radar control signal 13 from the sensor/controller 26 can sense a distance, velocity, and height 12 of the operator 11 while the operator 11 is in a sensing or detection area 16 of the radar. If the operator 11 performs a predetermined gesture, for example, either physically raising an arm or pressing a key fob button to indicate that they want the power actuated lift gate 14 to open, the radar control signal 13 can use the height 12 of the operator 11 as a method of determining how high the power actuated lift gate 14 should open. By not opening fully, but stopping at a predetermined height as shown by line 17 of FIG. 2, the operator 11 will be able to reach a close button (not shown) that is commonly located on a bottom or lower edge of the power actuated lift gate 14. Otherwise, the power actuated lift gate 14 will open fully, or to a predetermined fixed height, disallowing the operator 11 the ability to reach the button and close the power actuated lift gate 14. It should be appreciated that this application for a child also applies to a person with short stature. It should also be appreciated that the sensor/controller 26 is disposed "adjacent" the power actuated lift gate 14, which means on, in, or off to a side such as left, right, above, or below the power actuated lift gate 14.

A predetermined gesture by the operator 11, as described above, indicating that the power actuated lift gate 14 should open, may be defined as a sequence such as: approach the power actuated lift gate 14 by the operator 11 to a given distance, wait a second or two, and then the operator 11 back up a given distance. Another sequence may be to approach the power actuated lift gate 14 by the operator 11 to a given distance and perform an upward motion with a hand of the operator 11.

Figure 3:
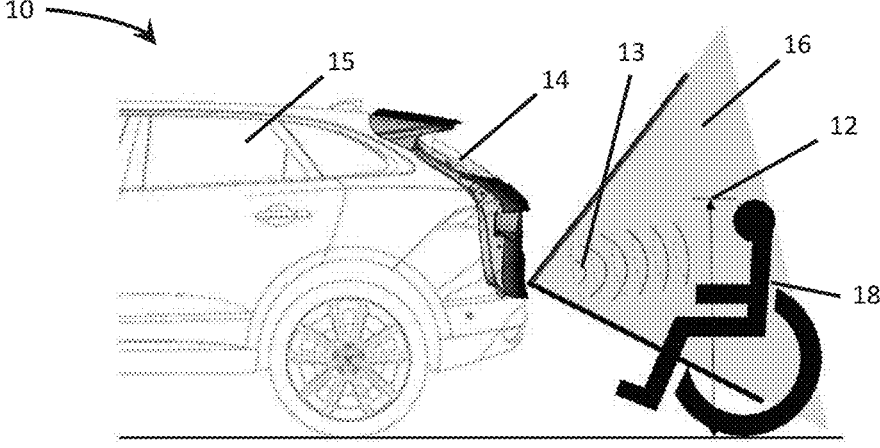
FIG. 3 is an elevational view of the system of FIG. 1 illustrating an operator in a wheelchair approaching a rear of the vehicle in which a sensor is used to detect the approach of the operator and a height of the operator.
Figure 4:
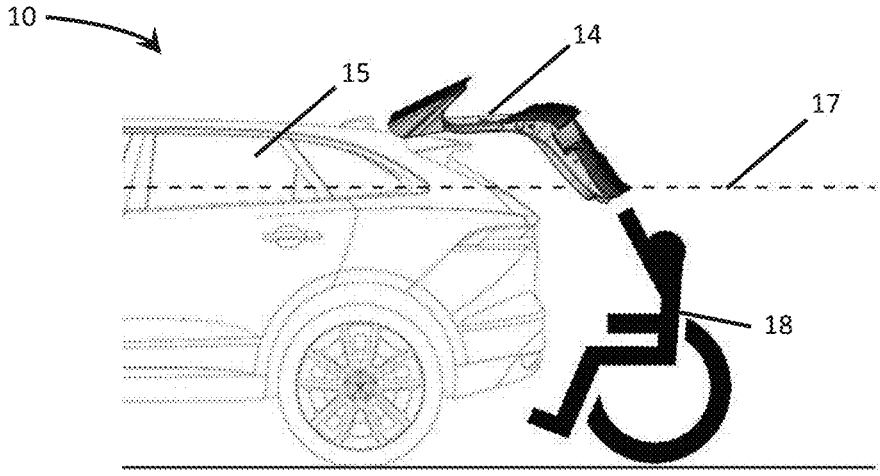
FIG. 4 is an elevational view of the system of FIG. 1 illustrating an operator in a wheelchair reaching for a switch on a lower edge of the power actuated lift gate of the vehicle.

The ability of the sensor/controller 26 to determine an operator characteristic such as the height 12 of the operator 11 also has clear advantages in the mobility sector. Referring to FIGS. 3 and 4, the operator 11 such as a person in a wheelchair 18 cannot reach a close button located on the lower edge of the power actuated lift gate 14 if the lift gate 14 opens fully. Again, there is clear advantage in being able to sense the height 12 of the operator 11 and adjust a position of the power actuated lift gate 14 open height, as shown by line 17, accordingly so that the operator 11 can reach the lower edge of the lift gate 14.

Figure 5:
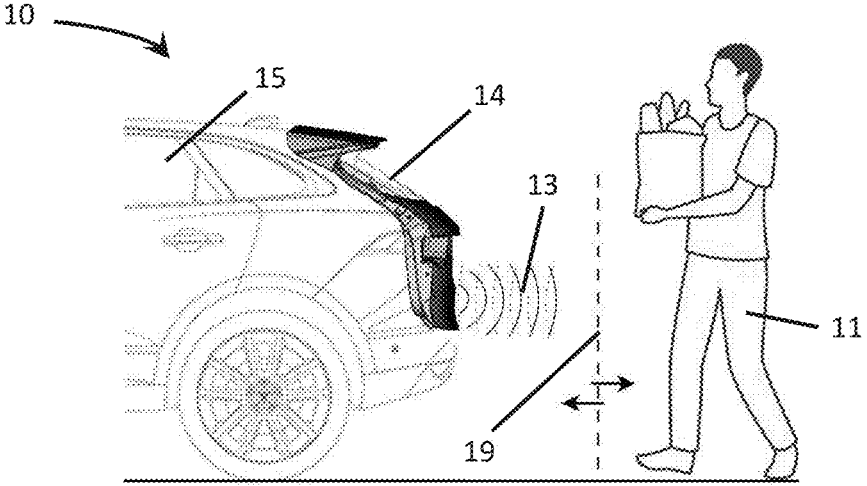
FIG. 5 is an elevational view of the system of FIG. 1 illustrating an operator such as an adult approaching the power actuated lift gate of the vehicle.

Referring now to FIG. 5, the system 10 can be used to sense and respond to a gesture by the operator 11 such as an adult indicating that they want the power actuated lift gate 14 to open. The sensor/controller 26 equipped on the power actuated lift gate 14 of the vehicle 15 emits the radar control signal 13 that detects the operator 11 approaching the vehicle 15. At a predetermined distance, as shown by dashed line 19, the operator 11 could walk up to the vehicle 15, stop and wait a second or two, and then back up a step. It should be appreciated that this motion or gesture will be interpreted by the system 10 as an indication that the operator 11 wants the power actuated lift gate 14 to open.

Figure 6:
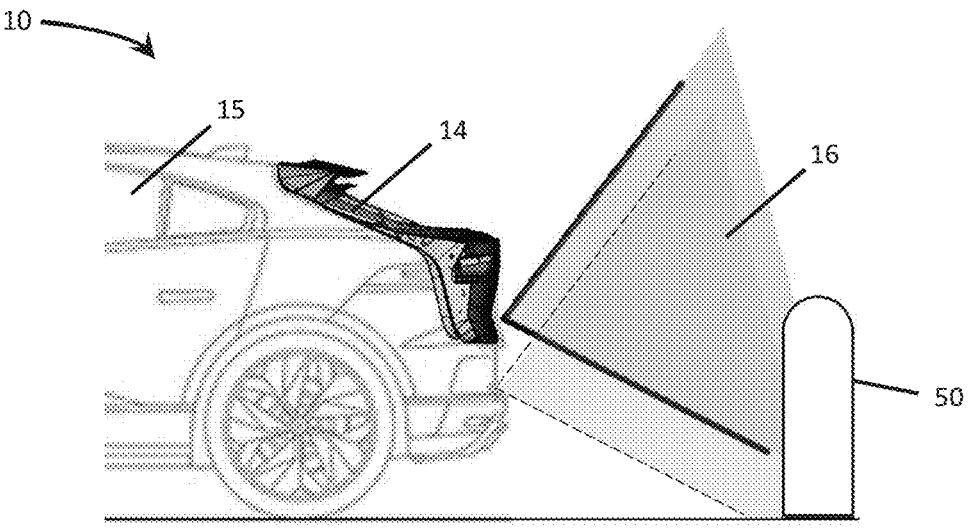
FIG. 6 is an elevational view of the system of FIG. 1 illustrating an obstruction coming into a field of view of a sensor on the power actuated lift gate of the vehicle when the vehicle is in reverse motion.

Referring now to FIG. 6, a further advantage of the system 10 is that the system 10 may be used as an obstruction detection system. When the vehicle 15 is in reverse and in motion, the sensor/controller 26 equipped on the power actuated lift gate 14 will send the radar control signals 13 into the detection area 16. If an object, such as post 50, is detected by the system 10, the vehicle 15 may emit a warning signal to a vehicle operator or enable the vehicle 15 to brake automatically to avoid a collision with the object.

Figure 7:
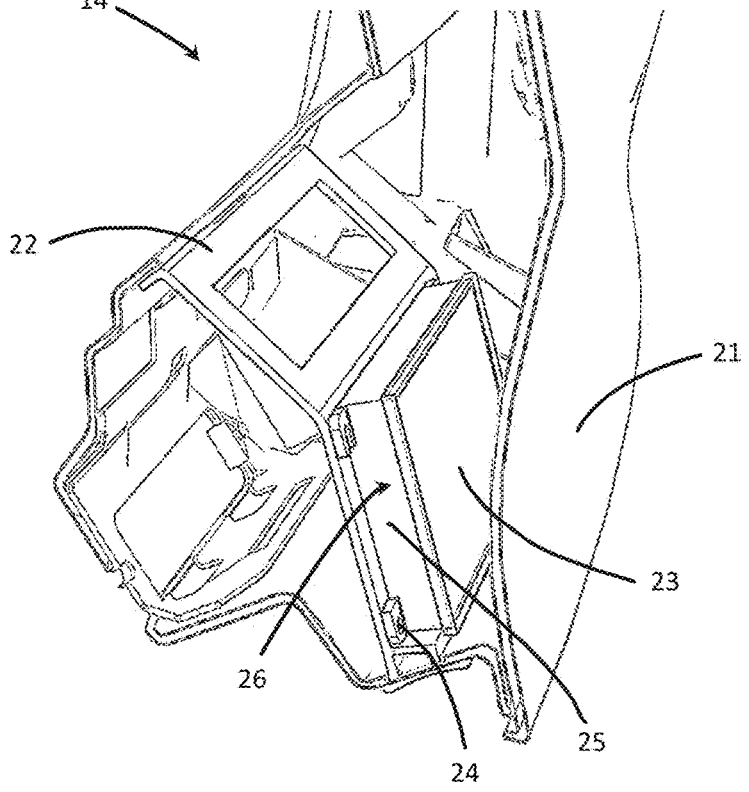
FIG. 7 is a cross-sectional and partial perspective view of the power actuated lift gate of the vehicle illustrating a sensor/controller and mounting bracket of the system of FIG. 1.

As illustrated in FIG. 7, the power actuated lift gate 14 shows a sensor/controller housing 25, cover 23, and mounting features 24 for mounting the sensor/controller 26 to a bracket 22 of the power actuated lift gate 14. In one embodiment, the sensor/controller 26 is disposed in an inside or interior cavity of the power actuated lift gate 14. In the embodiment illustrated, the sensor/controller 26 is disposed behind an outer surface 21 of the power actuated lift gate 14 through which the radar control signals 13 of FIGS. 1 and 3 are transmitted and received. It should be appreciated that the sensor/controller 26 may be separate components or integrated together. It should further be appreciated that, in another embodiment, the sensor/controller 26 may be mounted outside of the power actuated lift gate 14 such as behind a bumper facia as shown as a dashed line area in FIG. 6.

Figure 8:
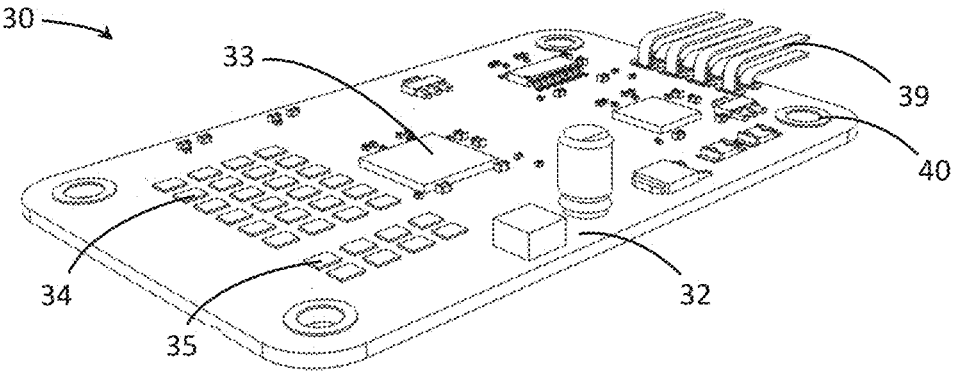
FIG. 8 is a perspective view of an electronic circuit board assembly of the sensor/controller of FIG. 7.
Figure 9:
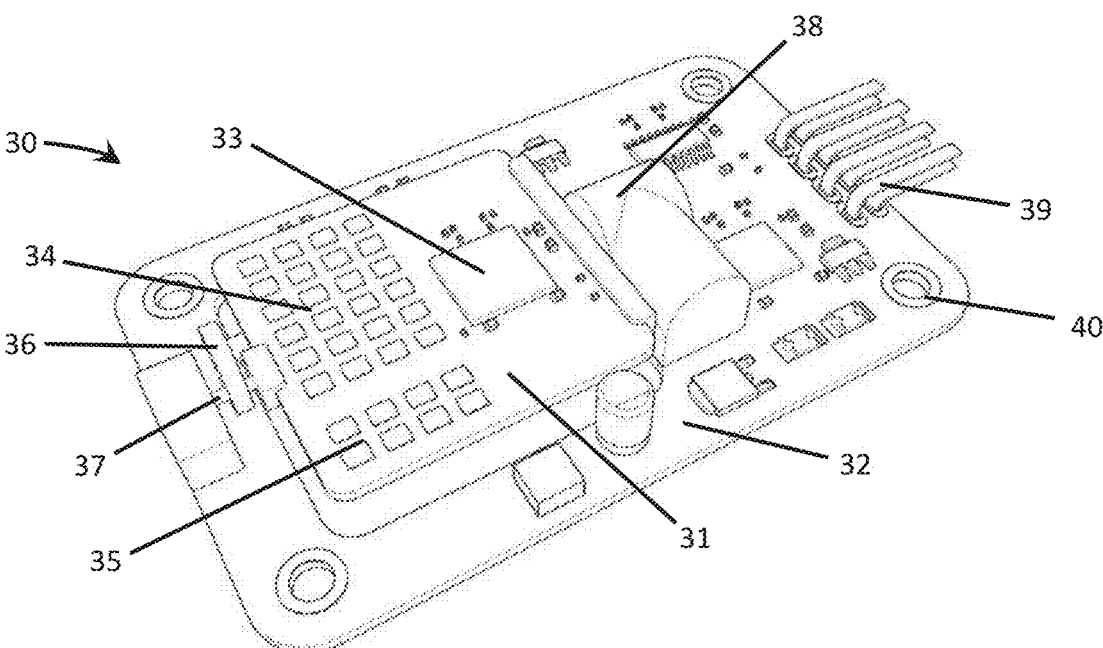
FIG. 9 is a perspective view of the electronic circuit board assembly of FIG. 8 illustrating a circuit board capable of being rotated out of parallel with a fixed circuit board.
Figure 10:
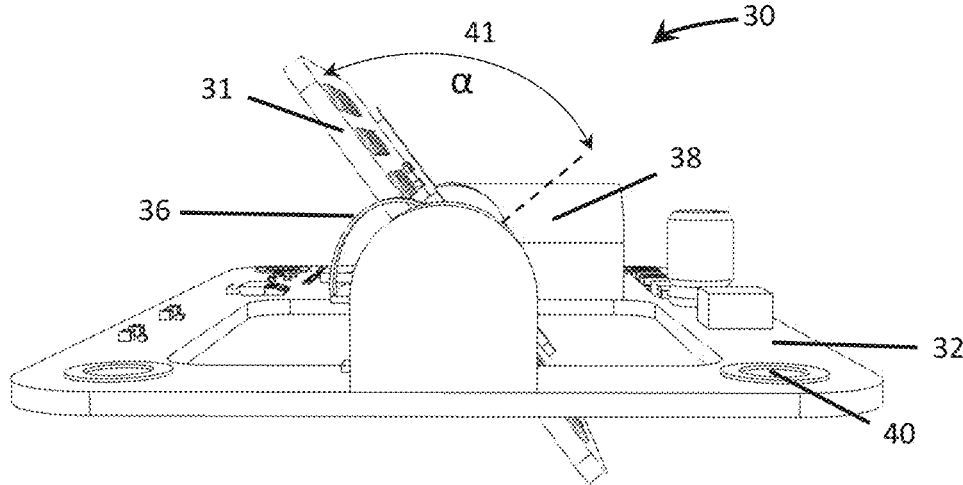
FIG. 10 is an end view of the electronic circuit board assembly of FIG. 9 illustrating the circuit board rotated out of parallel with the fixed circuit board.

With continued reference to FIGS. 7-10, in one embodiment, the sensor/controller 26 typically has a single electronic circuit board assembly 30, as shown in FIG. 8, that performs a transmit and receive function as previously described. FIG. 9 and FIG. 10 show other embodiments of the electronic circuit board assembly 30 having two electronic circuit boards 31 and 32. FIG. 9 shows general detail of the circuit board assembly 30 that has the required electronic components to perform radar sensing, computing, controlling of power actuated movable panels, and communications with a vehicle communications bus (not shown). The circuit board assembly 30 includes a main circuit board 32 with a connector 39, mounting features 40, an electro-mechanical device 38 such as a stepper motor, a flexible circuit board 36 for electrical communication, and a pivot shaft 37. The circuit board assembly 30 also includes a radar transmitting and receiving circuit board 31 shown in parallel to the main board 32. In one embodiment, the radar transmitting and receiving circuit board 31 includes an electronic radar controller 33, transmitting antennae 35, and receiving antennae 34. In another embodiment, the radar transmitting and receiving circuit board 31 may include Bluetooth or some other wireless communication to transmit radar sensing data from the radar transmitting and receiving circuit board 31 to the main circuit board 32.

When the power actuated lift gate 14 is closed, and the circuit boards 31 and 32 are parallel to each other, the detection area 16 of FIG. 1 and FIG. 3 is scanned to determine if there are any objects in its field of view. In this situation, the field of view or detection area 16 does not change—it is fixed and rearward looking relative to the power actuated lift gate 14 of the vehicle 15. However, it is advantageous to be able to change the field of view to enable the sensing of objects very low to the ground or very high relative to the vehicle 15. As illustrated in FIG. 10, the circuit board assembly 30 with the radar transmitting and receiving circuit board 31 is no longer parallel to the main circuit board 32. If desired, the electro-mechanical device 38 can be activated to rotate the radar transmitting and receiving circuit board 31 about a pivoting axis such as that provided by the pivot shaft 37. The angle α 41 developed between the circuit boards 31 and 32 will change the detection area 16 orientation and provide a wider, more inclusive field of view. This is clearly advantageous when the vehicle 15 is in reverse so that a small object like a curb can be sensed. Likewise, if the radar transmitting and receiving circuit board 31 is pivoted in an upward orientation, a garage door, ceiling, or other obstruction may be sensed to prevent the power actuated lift gate 14 from making contact. It should be appreciated that the angle α 41 of the radar transmitting and receiving circuit board 31 may vary based on the position of the power actuated lift gate 14 or it may be continuously scanning to increase its field of view such as when the vehicle 15 is in reverse.

In another embodiment, the circuit board assembly 30 includes a second axis of rotation perpendicular to a first axis to further increase the detection area 16 to include left and right sensing as well as up and down.

Figure 11:
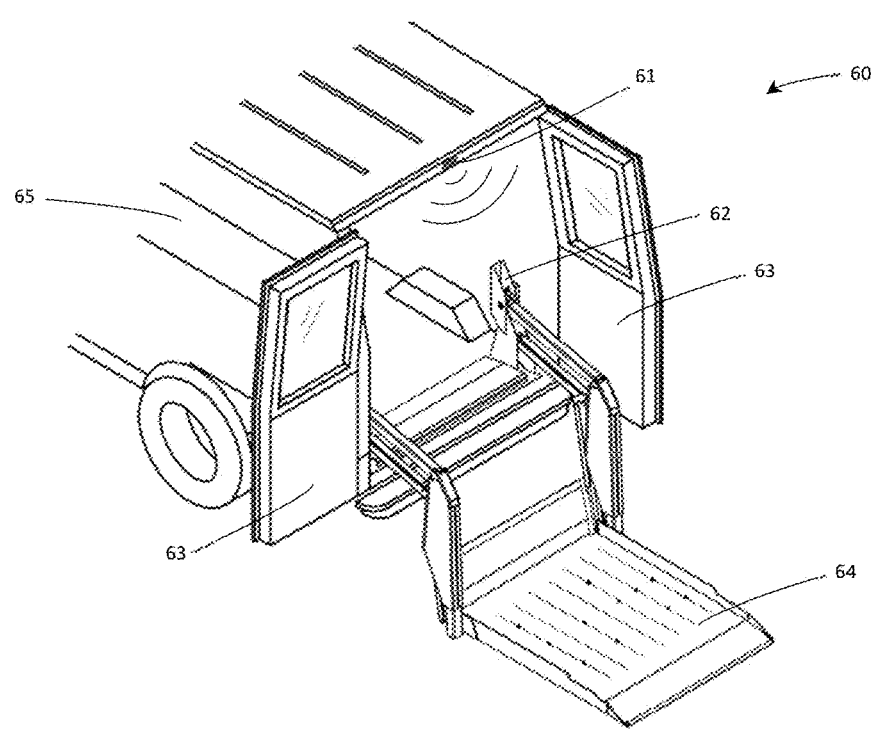
FIG. 11 is a perspective view of a vehicle with a radar module mounted above rear doors and a wheelchair lift extended for the system of FIG. 1.

As previously described, radar can be used to sense body or hand gestures and motions of a person to activate functions in a vehicle, thereby enhancing driver and passenger experience. By interpreting hand movements or body gestures, vehicles can be equipped to execute specific commands, providing a more intuitive and hands-free interface. An example is the deployment of a wheelchair lift from a vehicle so a wheelchair occupant may move onto the lift. FIG. 11 shows a vehicle 65 such as a van with an extended wheelchair lift 64 such as a ramp deployed from the rear of the vehicle 65. In this embodiment, the system 10 may be a sensing system 60 including a radar module/controller 61 with an illustrated location at a rear of the vehicle 65 in a frame above two rear doors 63, an actuation device 62, and the wheelchair lift 64.

The radar module/controller 61 transmits and receives radar signals and interprets the signals to determine if a person is in proximity to the vehicle 65 and if the person is making a predetermined motion or gesture indicating the desire to perform a function of the vehicle 65. For example, the radar module/controller 26 determines if the operator performed a predetermined motion or gesture that indicates the desire to perform the function of the vehicle 65 such as to adjust a position of a movable panel such as the lift gate 14 of the vehicle 65, initiate a kneeling operation of the vehicle 65, or to turn up or down a volume of a radio (not shown) of the vehicle 65 based on the predetermined motion or gesture.

Figure 14:
Figure 15:
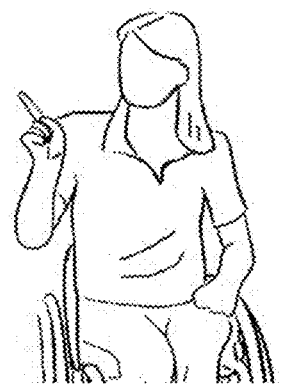

As illustrated in FIG. 15, a person is pointing a single finger up and away from their body. This gesture could be predetermined to mean open the rear doors 63 of the vehicle 65. In one embodiment, the rear doors 63 could be motorized to open and close as desired by hand or body gesture or by standard push button or touch screen methods. As illustrated in FIG. 14, a person is holding up their hand. This could be predetermined to mean close the rear doors 63 of the vehicle 65. Once the person is out of the vehicle 65 and away from the wheelchair lift 64, this motion would mean to energize the actuation device 62 and retract the wheelchair lift 64 back inside the vehicle 65 and to close the rear doors 63 when done.

Figure 12:
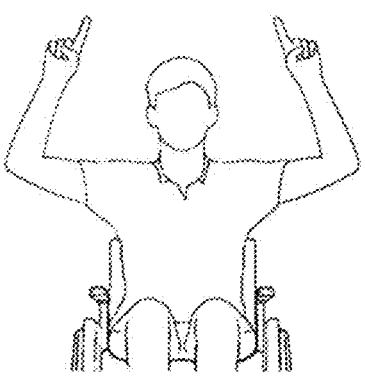
FIG. 12-FIG. 15 are elevational views of persons displaying hand gestures.
Figure 13:
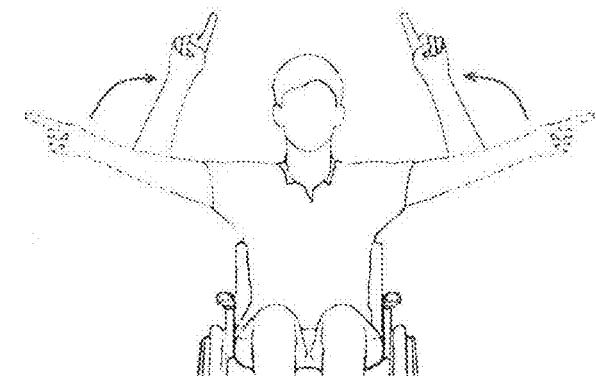

Yet another gesture, as illustrated in FIG. 12, is a person holding both hands up and pointing with both of their index fingers. This could be a predetermined gesture given by a person located on wheelchair lift 64 to mean lift and retract the wheelchair lift 64 to inside the vehicle 65. The gestures do not need to be static as illustrated in FIG. 12, rather they could include dynamic motion such as that illustrated in FIG. 13 where the person begins a gesture with arms pointed outward and then transitioning to pointing upward.

Radar technology enables the creation of customizable gesture profiles, allowing users to define their own set of gestures for specific vehicle functions. This personalization enhances the overall user experience, making the interaction between the driver and the vehicle more intuitive and tailored to individual needs and preferences.

An advantage of radar-based gesture sensing in vehicles is the potential for increased safety and convenience. Drivers can perform tasks like adjusting the volume, changing the radio station, or answering calls without taking their hands off the steering wheel. Radar-based gesture sensing can also contribute to making vehicle functions more accessible for individuals with physical disabilities. As previously described, gestures can aid in the entrance and exit of vehicles, but gestures can also offer alternative control methods, such as gesture-based inputs, so that the driving experience becomes more inclusive.

With traditional controls, drivers may need to look away from the road to interact with various buttons and switches. Radar-based gesture sensing minimizes distractions, allowing the driver to maintain focus on the road while still being able to control essential functions.

Radar technology enables the creation of customizable gesture profiles, allowing users to define their own set of gestures for specific vehicle functions. This personalization enhances the overall user experience, making the interaction between the driver and the vehicle more intuitive and tailored to individual needs and preferences.

As the automotive industry progresses toward autonomous vehicles, radar-based gesture sensing can play a crucial role. Passengers may use gestures to communicate with the vehicle, requesting specific actions or conveying preferences, contributing to a more interactive and user-friendly autonomous driving experience.

Unlike some optical-based gesture recognition systems that may struggle in adverse weather conditions or low lighting, radar is less affected by environmental factors. This makes it a reliable choice for gesture sensing in various driving scenarios.

Figures 16, 17:
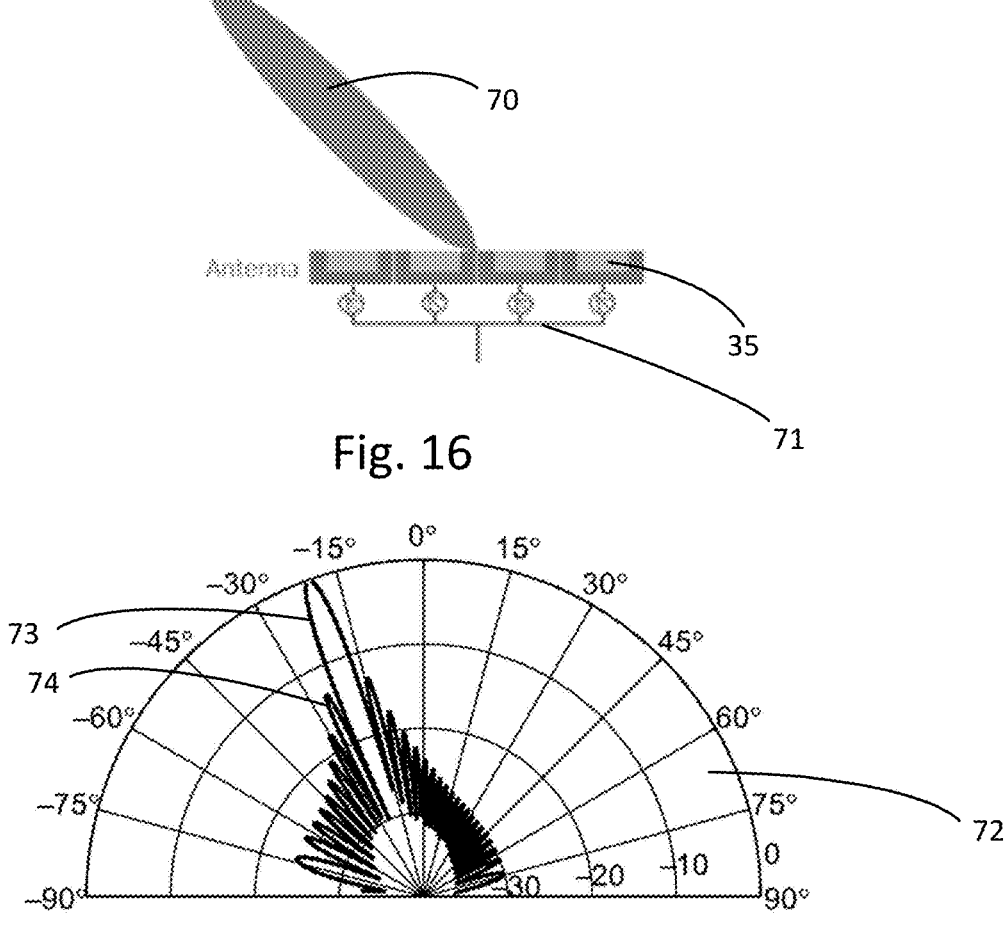
FIG. 16 is an end view of a radar patch antenna for the system of FIG. 1 illustrating transmit pads and a graphic representation of a radar signal main lobe.
FIG. 17 is a graph showing an angle of a radar signal main and side lobes as well as signal amplitude for the radar patch antenna of FIG. 16.

In one embodiment, FIG. 8 through FIG. 10 show circuits with radar phased array antennas on them. FIG. 8 is a phased array transmit and receive antenna in a fixed position and FIG. 9 and FIG. 10 have the phased array antenna in a configuration that can be rotated to provide for a wide or changeable field of view. In another embodiment, FIG. 16 and FIG. 17 show a radar phased array antenna with a main lobe of the radar signal being rotated to approximately −20 degrees from perpendicular to the circuit board by changing the electromagnetic drive signal phasing only, i.e., no physical moving of the antenna. It is a well know technique to change the phasing of individual antenna elements in order to beam steer the main and side-lobes of a radar signal. FIG. 16 shows the main radar lobe 70 as a graphic object emitting from the transmitting antennae 35 that are being driven by signals 71. By changing the signal drive timing of each element of the antennae 35, the radar signal can be dynamically steered to a desired angle. FIG. 17 shows the radar signal on a graph that shows angle and amplitude of the signal. As illustrated in FIG. 17, the main lobe 73 with side lobes 74 and harmonics change direction based on the phasing of the drive signals. Using this technique will provide for a wider field of view than what the fixed antennae 35 of FIG. 8 would allow. It should be appreciated that the use of beam steering has a clear advantage over the moveable antenna array shown in FIG. 9 and FIG. 10 in that it reduces complexity and cost of the overall system.

By using the system and method described, real time dynamic sensing can be employed to provide precise control over the radar's coverage area for target tracking and gesture recognition.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system comprising:
a radar sensor disposed in a vehicle for detecting an operator motion or gesture that indicates a desire to perform a function of the vehicle;
a controller in communication with said radar sensor to interpret sensor data and determine if the operator performed a predetermined motion or gesture that indicates the desire to perform the function of the vehicle based on the predetermined motion or gesture; and
wherein the radar sensor is rotatable, and the controller controls a rotation of the radar sensor to change a detection area orientation for a field of view of the radar sensor to detect the predetermined motion or gesture.

2. The system as set forth in claim 1 wherein said radar sensor and said controller comprise an electronic circuit board assembly.

3. The system as set forth in claim 2 wherein said electronic circuit board assembly includes a radar circuit board and a main circuit board.

4. The system as set forth in claim 3 wherein said radar circuit board includes said controller, a radar transmitting antennae, and a radar receiving antennae.

5. The system as set forth in claim 4 wherein said main circuit board comprises a flexible circuit board for electrical communication and a pivot shaft.

6. The system as set forth in claim 5 wherein said main circuit board includes an electro-mechanical mechanism to rotate said radar circuit board relative to said main circuit board about said pivot shaft.

7. The system as set forth in claim 6 wherein said electro-mechanical mechanism comprises a stepper motor to rotate said radar circuit board relative to said main circuit board about said pivot shaft.

8. The system as set forth in claim 1 wherein the predetermined motion or gesture is for opening and closing of a movable panel.

9. The system as set forth in claim 1 wherein the predetermined motion or gesture is for kneeling of the vehicle.

10. The system as set forth in claim 1 wherein the predetermined motion or gesture is for wheelchair lift extension and retraction.

11. The system as set forth in claim 1 wherein predetermined motion or gesture is a phased array beam steering to provide wider field of view than what a fixed antenna allows for dynamic changing of angle of a main lobe of a radar signal.

12. A method comprising the steps of:
detecting, by a radar sensor disposed in a vehicle, an operator motion or gesture that indicates a desire to perform a function of the vehicle;
determining, by a controller in communication with the radar sensor, if the operator performed a predetermined motion or gesture that indicates the desire to perform the function of the vehicle based on the predetermined motion or gesture;
rotating, the radar sensor, to change a detection area orientation for a field of view of the radar sensor; and
performing, by the controller, the function of the vehicle based on the predetermined motion or gesture.

13. The method as set forth in claim 12 including the step of generating, by the radar sensor, an object signal indicative of the operator being detected in proximity to the sensor.

14. The method as set forth in claim 12 including the step of interpreting, by the controller, the object signal to determine the predetermined motion or gesture.

15. The method as set forth in claim 12 including the step of transmitting, by the controller, a control signal to move a movable panel along a path between closed and opened positions.

16. The method as set forth in claim 15 including the step of communicating, by the controller, the control signal with vehicle modules of the vehicle over an in-vehicle communications bus.

17. The method as set forth in claim 12 wherein the step of sensing comprises sensing, by the radar sensor, above the movable panel.

18. The method as set forth in claim 12 wherein the step of determining comprises determining, by the controller, the predetermined motion or gesture.

19. The method as set forth in claim 12 including the step of rotating a radar antenna of the radar sensor to enhance field of view.

20. The method as set forth in claim 17 including the step of adjusting the position of the movable panel to a position based on the predetermined motion or gesture.

21. The method as set forth in claim 12 wherein the predetermined motion or gesture is for door opening and closing.

22. The method as set forth in claim 12 wherein the predetermined motion or gesture is for wheelchair lift extension and retraction.

23. The method as set forth in claim 12 wherein the predetermined motion or gesture is for kneeling of the vehicle.

24. The method as set forth in claim 12 wherein predetermined motion or gesture is a phased array beam steering to provide wider field of view than what a fixed antenna allows for dynamic changing of angle of a main lobe of a radar signal.

25. A vehicle comprising:
a power actuated movable panel;
a radar sensor disposed adjacent the power actuated movable panel for detecting an operator motion or gesture that indicates a desire to perform a function of the power actuated movable panel;
a controller in communication with the sensor to interpret sensor data of the operator from the radar sensor to determine if the operator performed a predetermined motion or gesture that indicates the desire to perform the function of adjusting a position of the power actuated movable panel based on the predetermined motion or gesture; and
wherein the radar sensor is rotatable, and the controller controls a rotation of the radar sensor to change a detection area orientation for a field of view of the radar sensor to detect the predetermined motion or gesture.

26. The vehicle as set forth in claim 25 wherein said power actuated movable panel comprises one of a lift gate, trunk, door, and tailgate.

27. The vehicle as set forth in claim 25 wherein said controller is integrated into an electronic circuit board assembly.

* * * * *